United States Patent
Bang

(10) Patent No.: US 12,056,617 B2
(45) Date of Patent: *Aug. 6, 2024

(54) LEARNING AND DETECTION METHOD OF NEURAL NETWORK MODEL FOR FLAME DETERMINATION, AND APPARATUS PERFORMING THE SAME

(71) Applicant: GYNETWORKS CO., LTD., Incheon (KR)

(72) Inventor: Seung On Bang, Seoul (KR)

(73) Assignee: GYNETWORKS CO., LTD., Incheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,937

(22) Filed: May 25, 2023

(65) Prior Publication Data

US 2023/0297840 A1 Sep. 21, 2023

Related U.S. Application Data

(63) Continuation of application No. 17/357,928, filed on Jun. 24, 2021, now Pat. No. 11,687,787, which is a (Continued)

(30) Foreign Application Priority Data

Jul. 19, 2019 (KR) .................. 10-2019-0087769

(51) Int. Cl.
*G06N 3/084* (2023.01)
*G06N 3/045* (2023.01)
(Continued)

(52) U.S. Cl.
CPC ............. *G06N 3/084* (2013.01); *G06N 3/045* (2023.01); *G06N 3/08* (2013.01); *G06T 7/0002* (2013.01);
(Continued)

(58) Field of Classification Search
CPC .......... G06N 3/045; G06N 3/047; G06N 3/08; G06N 3/084; G06T 17/00; G06T 7/0002;
(Continued)

(56) References Cited

U.S. PATENT DOCUMENTS 10,382,712 B1 * 8/2019 Forutanpour ............. G06T 5/90
2003/0214583 A1 * 11/2003 Sadok .................. G08B 17/125
348/143

(Continued)

FOREIGN PATENT DOCUMENTS

JP 2018-088630 A 6/2018

OTHER PUBLICATIONS

Suleyman Aslan, "Deep Convolutional Generative Adversarial Networks Based Flame Detection in Video", Computer Vision and Pattern Recognition, arXiv:1902.01824, Feb. 5, 2019, pp. 1-4.*

(Continued)

*Primary Examiner* — Omar S Ismail
(74) *Attorney, Agent, or Firm* — WHDA, LLP

(57) ABSTRACT

Disclosed herein is a learning method of a neural network model for flame determination. The learning method of a neural network includes generating a learning image including a fake image generated by combining a real fire image and an arbitrary flame image with a background image; inputting the learning image to a first neural network model and outputting a determination result for whether a flame is present; and updating a weight in a layer extracting features of the learning image from the first neural network model using the determination result. According to the present invention, data of various fire situations may be secured, a performance of the neural network model that determines an occurrence of the fire through the secured data may be (Continued)

increased, and a quality of data for learning may be increased to allow the neural network model itself to predict various situations of fires.

11 Claims, 8 Drawing Sheets

Related U.S. Application Data continuation of application No. 16/663,526, filed on Oct. 25, 2019, now Pat. No. 11,074,501.

(51) Int. Cl.
| | |
|---|---|
| *G06N 3/08* | (2023.01) |
| *G06T 7/00* | (2017.01) |
| *G06T 17/00* | (2006.01) |
| *G06V 10/764* | (2022.01) |
| *G06V 10/774* | (2022.01) |
| *G06V 10/82* | (2022.01) |
| *G06V 20/52* | (2022.01) |

(52) U.S. Cl.
CPC ............ *G06T 17/00* (2013.01); *G06V 10/764* (2022.01); *G06V 10/774* (2022.01); *G06V 10/82* (2022.01); *G06V 20/52* (2022.01)

(58) Field of Classification Search
CPC .... G06V 10/764; G06V 10/774; G06V 10/82; G06V 20/52
See application file for complete search history.

(56) References Cited

U.S. PATENT DOCUMENTS

| | | | | |
|---|---|---|---|---|
| 2004/0061777 | A1* | 4/2004 | Sadok ................. | G08B 17/125 348/83 |
| 2005/0069207 | A1* | 3/2005 | Zakrzewski ........... | G06V 20/52 382/218 |
| 2019/0138898 | A1* | 5/2019 | Song ........................ | G06N 3/08 |
| 2019/0220709 | A1* | 7/2019 | Freeman .................. | G06N 3/08 |
| 2019/0244504 | A1* | 8/2019 | Ebata .................... | G08B 25/009 |
| 2019/0279478 | A1* | 9/2019 | Ebata ..................... | G06N 3/045 |

OTHER PUBLICATIONS

Yu Chunyu, "Video Fire Smoke Detection Using Motion and Color Features", Fire Technology, 46, 651-663, 2010,2009 Springer Science+ Business Media, LLC.,Sep. 29, 2009, pp. 651-660.*
Chunyu Yu, "A real-time video fire flame and smoke detection algorithm", Procedia Engineering 62 ( 2013 ) 891-898, Science Direct, The 9th Asia-Oceania Symposium on Fire Science and Technology, pp. 891-896.*
Yingshu Penga, "Real-time forest smoke detection using hand-designed features and deep learning, "Computers and Electronics in Agriculture 167 (2019) 105029,Sep. 29, 2019, pp. 3-16.*
Nguyen Manh Dung, "A Video Smoke Detection Algorithm Based on Cascade Classification and Deep Learning," KSII Transactions on Internet and Information Systems vol. 12, No. 12, Dec. 2018, pp. 6018-6030.*
Feiniu Yuan, "Deep smoke segmentation", Neurocomputing 357 (2019) 248-260, Science Direct, Available online May 10, 2019, pp. 1-9.*
Dongil Han, "Flame and smoke detection method for early real-time detection of a tunnel fire", Fire Safety Journal 44(2009)951-961, Science Direct, May 6, 2009, pp. 951-959.*
Zhang, Qi-xing et al., "Wildland Forest Fire Smoke Detection Based on Faster R-CNN using Synthetic Smoke Images", Procedia Engineering, 2018, pp. 441-446; Cited in KR Office Action dated Jan. 6, 2020.*
Namozov, A. et al., "An Efficient Deep Learning Algorithm for Fire and Smoke Detection with Limited Data," Advances in Electrical and Computer Engineering, vol. 18, No. 4, 2018. (9 pages).*
Han, C. et al., "GAN-Based Synthetic Brain MR Image Generation," 2018 IEEE 15th International Symposium on Biomedical Imaging (ISBI 2018), Apr. 4-7, 2018, Washington D.C., USA. (5 pages).*
Xu, Gao et al., "Deep Domain Adaptation Based Video Smoke Detection using Synthetic Smoke Images". Fire safety journal, 2017, 17 pages; Cited in KR Office Action dated Jan. 6, 2020.*
Dongqing Shen, "Flame Detection Using Deep Learning," Jun. 14, 2018, 2018 4th International Conference on Control, Automation and Robotics (ICCAR), pp. 416-419.*
Yang Zhikar, "Fire Image Generation Based on ACGAN," Sep. 12, 2019,2019 Chinese Control and Decision Conference (CCDC), pp. 5743-5745.*
Office Action dated Jan. 6, 2020, issued in counterpart KR Application No. 10-2019-0087769 (5 pages).
Aslan, Suleyman et al., "Deep Convolutional Generative Adversarial Networks Based Flame Detection in Video", Feb. 5, 2019, 5 pages; Cited in KR Office Action dated Jan. 6, 2020.
Yu Chunyu, "Video Fire Smoke Detection Using Motion and Color Feature", Fire Technology, 46, 651-663, 2010, 2009 Springer Science+ Business Media, LLC, Sep. 29, 2009, pp. 651-660.
Yingshu Penga, "Real-time forest smoke detection using hand-designated features and deep learning," Computers and Electronics in Agriculture 167 (2019) 105029, Sep. 29, 2019, pp. 3-16.
Cheoi, K. et al. "An Intelligent Fire Learning and Detection System Using Convolutional Neural Networks," KIPS Tr. Software and Data Eng., vol. 5, No. 11, pp. 607-614 (2016). (8 pages).
Office Action dated Aug. 26, 2022, issued in counterpart KR application No. 10-2020-0026909 with English translation. (10 pages).
Office Action dated Oct. 3, 2023 issued in counterpart JP Application No. 2019-206402 with English translation. (7 pages).
Zhikai, Y. et al.; "Fire Image Generation Based on ACGAN", The 31th Chinese Control and Decision Conference (2019 CCDC), Jun. 5, 2019, pp. 5743-5746. (4 pages).

* cited by examiner

LEARNING AND DETECTION METHOD OF NEURAL NETWORK MODEL FOR FLAME DETERMINATION, AND APPARATUS PERFORMING THE SAME

CROSS-REFERENCE TO RELATED APPLICATION(S)

This application is a continuation application of U.S. patent application Ser. No. 17/357,928 filed on Jun. 24, 2021, which is a continuation application of U.S. patent application Ser. No. 16/663,526 filed on Oct. 25, 2019, which claims benefit of priority to Korean Patent Application No. 10-2019-0087769 filed on Jul. 19, 2019 in the Korean Intellectual Property Office, the disclosure of which is incorporated herein by reference in its entirety.

BACKGROUND

1. Field

The present invention relates to a learning method of a neural network model for flame determination.

2. Description of Related Art

Since a fire causes massive damage to human and material when it occurs, the fire is a field that needs prevention and early detection, and sensing technologies for prevention and early detection of the fire are being developed, and products that determine the occurrence of a fire are commercially available in various forms.

However, conventional sensors that determine heat, smoke, or flame may only determine local areas, and detection errors may easily occur depending on the surrounding environment, which limits the detection of the occurrence of a fire in a wider area.

Recently, with the development of image processing technology, an intelligent surveillance system that monitors opened wide areas with little influence of the surrounding environment based on CCTV images is being operated, and a technology for detecting a fire using the same has been developed.

For example, a method of determining the occurrence of a smoke or a flame in an image through an optical flow and determining the occurrence of a fire through the determination is being developed. However, the image processing has a disadvantage in that it takes a lot of cost and time for processing.

In this regard, with the development of machine learning technology, the machine learning technology has recently been applied to various fields, and the machine learning technology has been also applied to the fields related to accidents and disasters to analyze various data faster to determine the occurrence of threats to safety.

Machine learning learns neural networks that mimic a human brain and infers results from input data to output faster and higher-level determination results.

Since the performance of the neural network model learned through such machine learning has a direct influence on the quantity and quality of learning data, it may be important to secure high quality data.

However, since data of the accident and disaster situation such as a fire is less regular and there is a problem that it is more difficult to secure as compared to data used for recognition of general objects, it takes a lot of cost and time to secure the learning data for learning the neural network.

Therefore, in order to increase the performance of the neural network model for determining the accident situation such as a fire, a specific method for securing learning data is required, and it is necessary to generate a really applicable learning model using the secured learning data.

SUMMARY

An object of the present invention is to provide a method for efficiently securing learning data of a neural network model, and a learning method using the learning data.

Another object of the present invention is to provide a method for determining whether a fire occurs more quickly and accurately by using a neural network model.

According to an exemplary embodiment of the present invention, a learning method of a neural network model for flame determination includes generating a learning image including a fake image generated by combining a real fire image and an arbitrary flame image with a background image; inputting the learning image to a first neural network model and outputting a determination result for whether a flame is present; and updating a weight in a layer extracting features of the learning image from the first neural network model using the determination result.

The flame image may be a fake flame image generated according to a second neural network model.

The first neural network model may include a plurality of layers, and at least one layer of the layers may have the number of channels of a single row or column.

The first neural network model may be constituted by a plurality of layers having the channels of the single row or column and the number of input or output channels of the first neural network model.

The fake image may be an image generated by using a third neural network model learned to reduce a difference in a discrimination value that discriminates authenticity between the fake image and the real fire image.

The flame image may be a flame image collected on a web.

The flame image may be a flame image generated by computer modeling.

According to another exemplary embodiment of the present invention, a flame detection method of a neural network model includes generating a plurality of images by sequentially reducing a source image according to a predetermined ratio or size; inputting the plurality of images to a neural network model learned to determine whether a flame is present; and outputting, by the neural network model, whether the flame is present in at least one image of the plurality of images.

The neural network model may include a plurality of layers, and at least one layer of the layers may have the number of channels of a single row or column.

The neural network model may be constituted by a plurality of layers having the channels of the single row or column and the number of input or output channels of the neural network model.

The neural network model may be learned by repeatedly performing operations of: generating a learning image including a fake image generated by combining a real fire image and an arbitrary flame image with a background image; inputting the learning image to a first neural network model and outputting a determination result for whether a flame is present; and updating a weight in a layer extracting features of the learning image from the first neural network model using the determination result.

The fake image may be an image generated by using a second neural network model learned to reduce a difference in a discrimination value that discriminates authenticity between the fake image and the real fire image.

According to the present invention, the data of various fire situations may be secured, and the performance of the neural network model that determines the occurrence of the fire through the secured data may be increased.

In addition, the quality of the data for learning may be improved, thereby allowing the neural network model to predict the fire in various situations on its own.

In addition, according to the present invention, the determination error of the neural network model according to the size and resolution of the data input for detecting the fire situation may be reduced, and high performance may be adaptively shown to various data.

Further, even if the amount of data input for detecting the fire is enormous, the fast determination result may be efficiently generated, thereby detecting the fire situation in real time.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

The following description illustrates only a principle of the present invention. Therefore, those skilled in the art may invent various devices that implement the principle of the present invention and are included in the spirit and scope of the present invention although not clearly described or shown in the present specification. In addition, it is to be understood that all conditional terms and exemplary embodiments listed in the present specification are obviously intended only to allow those skilled in the art to understand a concept of the present invention in principle, and the present invention is not limited to the exemplary embodiments and states particularly listed as described above.

The above-mentioned objects, features, and advantages will become more obvious from the following detailed description provided in relation to the accompanying drawings. Therefore, those skilled in the art to which the present invention pertains may easily practice a technical idea of the present invention.

Further, in describing the present invention, in the case in which it is determined that a detailed description of a known technology associated with the present invention may unnecessarily make the gist of the present invention unclear, it will be omitted. Hereinafter, exemplary embodiments of the present invention will be described in detail with reference to the accompanying drawings.

<Learning Method of Neural Network Model>

Figure 1:
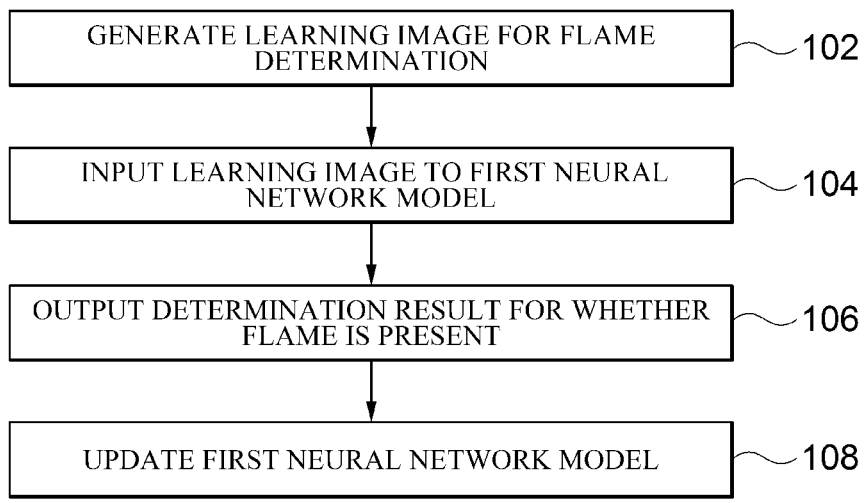
FIG. 1 is a view illustrating a learning method of a neural network model according to an exemplary embodiment of the present invention.

FIG. 1 is a flowchart illustrating a learning method of a neural network model for flame determination according to an exemplary embodiment of the present invention.

Referring to FIG. 1, a learning method 100 according to the present exemplary embodiment first generates learning data for learning (102).

Specifically, the learning data may be generated as an image including a fake image generated by combining a real fire image and an arbitrary flame image with a background image.

That is, in the present exemplary embodiment, both an image in which a real flame situation occurs and an image generated by using a fake flame image may be used for learning.

When the learning image is generated, the generated learning image is input to a first neural network model (104).

The first neural network model outputs a determination result for whether a flame is present from the input learning image (106).

The first neural network model may extract feature values of the learning image input through an internal layered layer structure through a convolution operation, and may determine the presence of the flame by reconstructing the extracted feature values in one dimension.

The first neural network model is updated by using the determination result for whether the flame is present by the output of the first neural network model (108).

The above-mentioned operations may be repeatedly performed through various learning data. In the present exemplary embodiment, a learning image in which the flame situation is present and a learning image in which the flame situation is not present may be pre-labeled and used for learning using a supervised learning method.

The first neural network model extracts the feature values of the input data by performing a convolution operation through the internal layers. In this case, filter values used to extract the feature values may be updated according to the determination result. Specifically, the update may be performed by back-propagating an error of the determination result to update a weight of a layer generating the error.

By repeatedly performing the above steps, the first neural network model may update the layer to find an optimal filter value for each layer, thereby making it possible to allow the first neural network model to deduce an accurate result when the real flame is detected.

Figure 2:
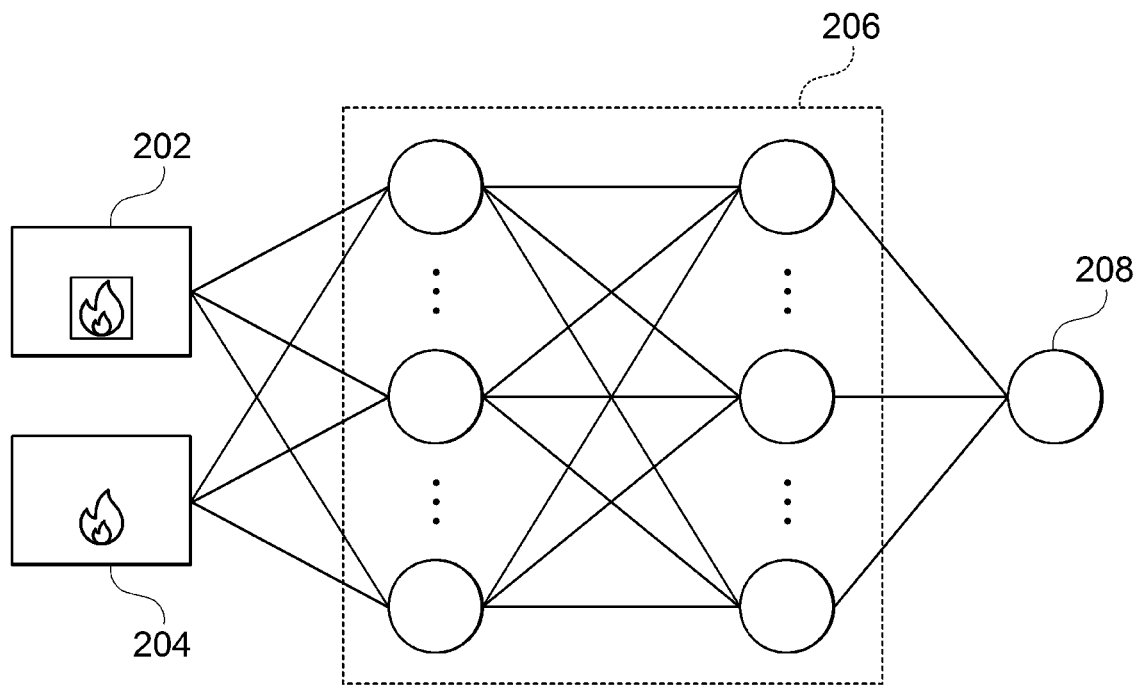
FIG. 2 is a view illustrating a structure of a neural network model according to an exemplary embodiment of the present invention.

Referring to FIG. 2, FIG. 2 is a view conceptually illustrating a structure of the first neural network model described above. The first neural network model may receive both a real fire image 204 and a fake image 202 generated with an arbitrary flame image as a learning image.

A convolution operation may be performed for the learning image input to a neural network model 206 through layers in the neural network. The neural network model may input a feature map generated by the convolution operation to a fully connected layer generating a one-dimensional output, and generate a final output 208 through a nonlinear function.

Specifically, the neural network model according to the present exemplary embodiment may output a determination result for whether a flame is present in the input learning image.

For example, the neural network model according to the present exemplary embodiment may pre-label a position of the flame because the learning image generated by the supervised learning method includes the flame, and may be learned to determine that the flame is present.

In this case, the fake image generated to secure the learning data needs to have a high degree of depiction of a real fire occurrence so that more accurate learning may be performed.

Hereinafter, a method for generating a flame image in the learning method according to the present invention will be described with reference to FIG. 3.

In the present exemplary embodiment, a flame image 312 may be generated by using a discriminator D 304 that determines authenticity of a fire image (x) 302 and outputs a result D(x) 306.

Specifically, a second neural network model generating the flame image may include a generator G 310 that generates a fake flame image G(z) 312 through an input Z value 308, and a domain discriminator D 304 that determines authenticity of a specific image.

That is, the learning of the second neural network model may be performed by using the above-mentioned discriminator D 304 that outputs the authenticity D(G(z)) 314 as a result of the determination of the presence of the flame from the generated flame image.

Figure 3:
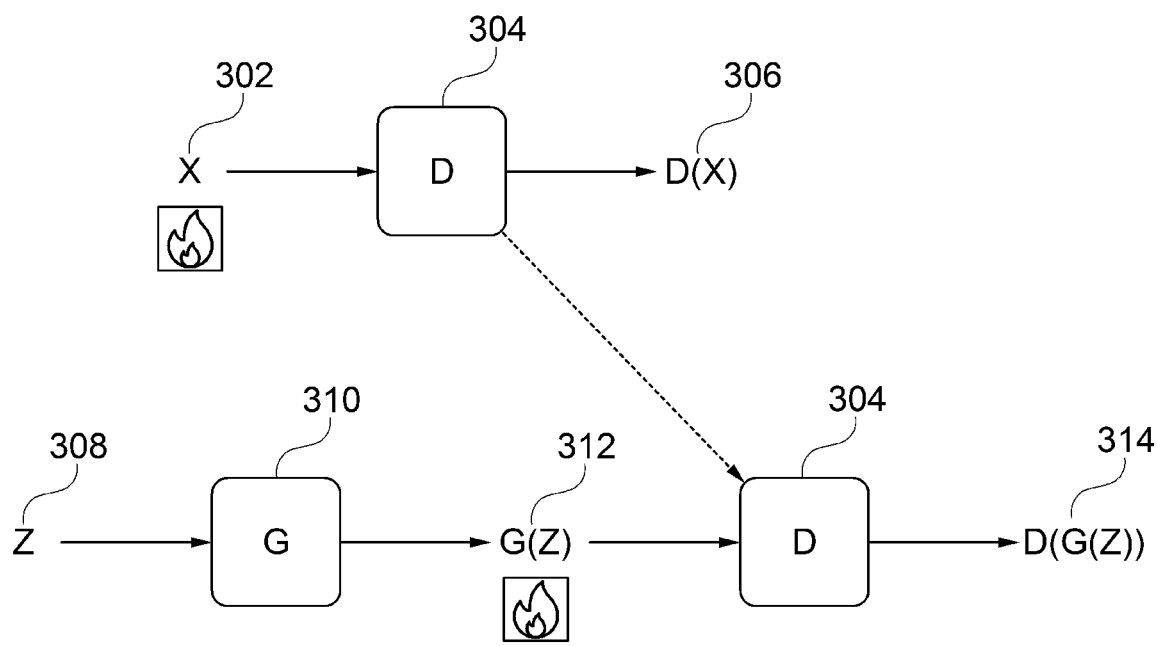
FIGS. 3 to 5 are views conceptually illustrating a method for generating learning data of a neural network model according to an exemplary embodiment of the present invention.

That is, the generator G 310 may be learned so that the flame image G(z) 312 generated from the generator G 310 of FIG. 3 is determined to be a real flame by the discriminator D 304, and in a learning process, the domain discriminator D 304 may repeat the learning process hostilely to determine that the authenticity of the fake image is low.

Thereby, the learned generator G 310 may generate various flame images 312 close to the real flame according to the input value z 308.

When the learning is completed through the above-mentioned method, the fake flame image similar to the real flame may be theoretically created indefinitely by using the generator of the second neural network model. However, since the number of real images used for learning is not sufficient to represent the entire domain of the real flame image, it is difficult to say that a probability distribution of the fake flame image perfectly mimics the probability distribution of the real flame image.

Therefore, as more fake flame images are unconditionally used for learning, the learning is over-fitted with the fake image, which may degrade a flame detection performance in the real environment. In order to solve the above-mentioned problem, the neural network model according to the present invention may perform the learning by introducing a third neural network model to make the first neural network model work well even in a general environment.

Specifically, the third neural network model may be learned in a direction of reducing discrimination ability of a domain discriminator 414 for discriminating a domain (Fake) of a fake image and a domain (Real) of a real fire image.

For example, a flame image 402 generated using the second neural network model described above and a flame of a real fire image 408 are mapped to the same feature space, and ultimately, it is possible to improve the degree of depiction of a fire occurrence situation of the fake image generated by the flame image to be closer to reality.

That is, the third neural network model learns the mapping that makes the real fire image 408 and a fake flame image 406 indistinguishable from each other in the feature space. Therefore, when the first neural network model learns to detect the flame in the feature space mapped by the third neural network model, it is possible to improve the flame detection performance on the real flame image.

Figure 4:
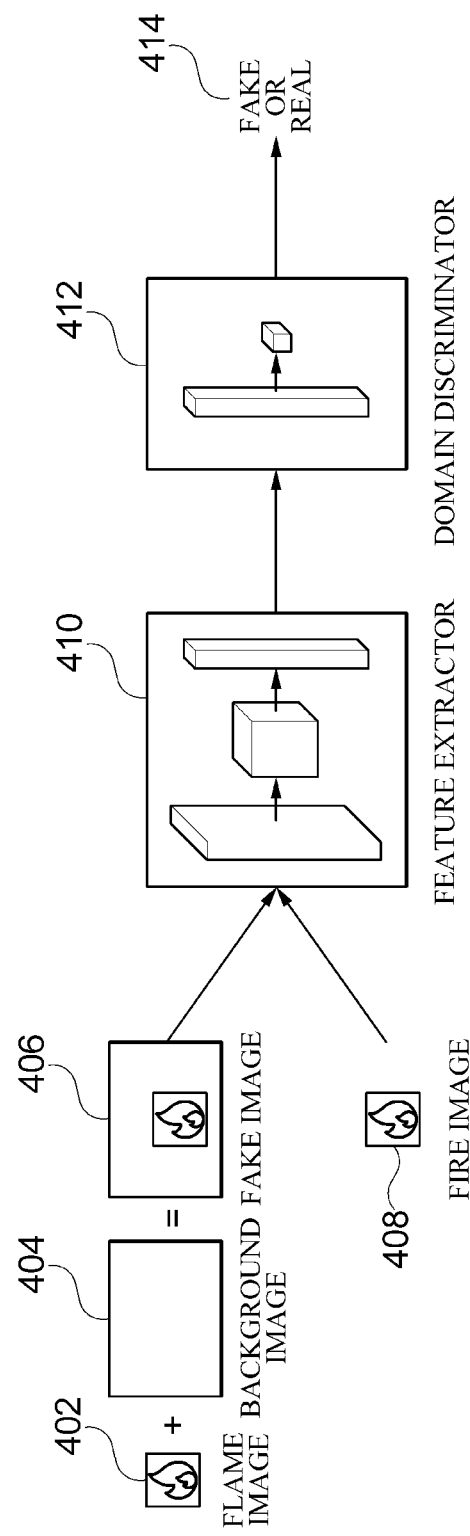

Specifically, referring to FIG. 4, the third neural network model may receive the real fire image 408 as source data and the fake image 406 in which the arbitrary flame image 402 and a background image 404 are combined as target data.

A feature extractor 410 may extract a feature from the input data through a convolution operation, and transfer the extracted feature to a domain discriminator 412.

The domain discriminator 412 may discriminate whether the input image is a source data domain or a target data domain input through the extracted feature and output a domain label (414).

In this case, the third neural network model may be updated in a direction of reducing the factors affecting the discrimination of the domain through learning, and may map the real flame image and the fake image to the same feature space by removing a difference between the source domain and the target domain.

That is, in the learning method according to the present invention, data quality of the generated fake image may be improved through the second neural network, and an accuracy of the determination result of the first neural network model may be improved by using the third neural network model for learning.

Figure 5:
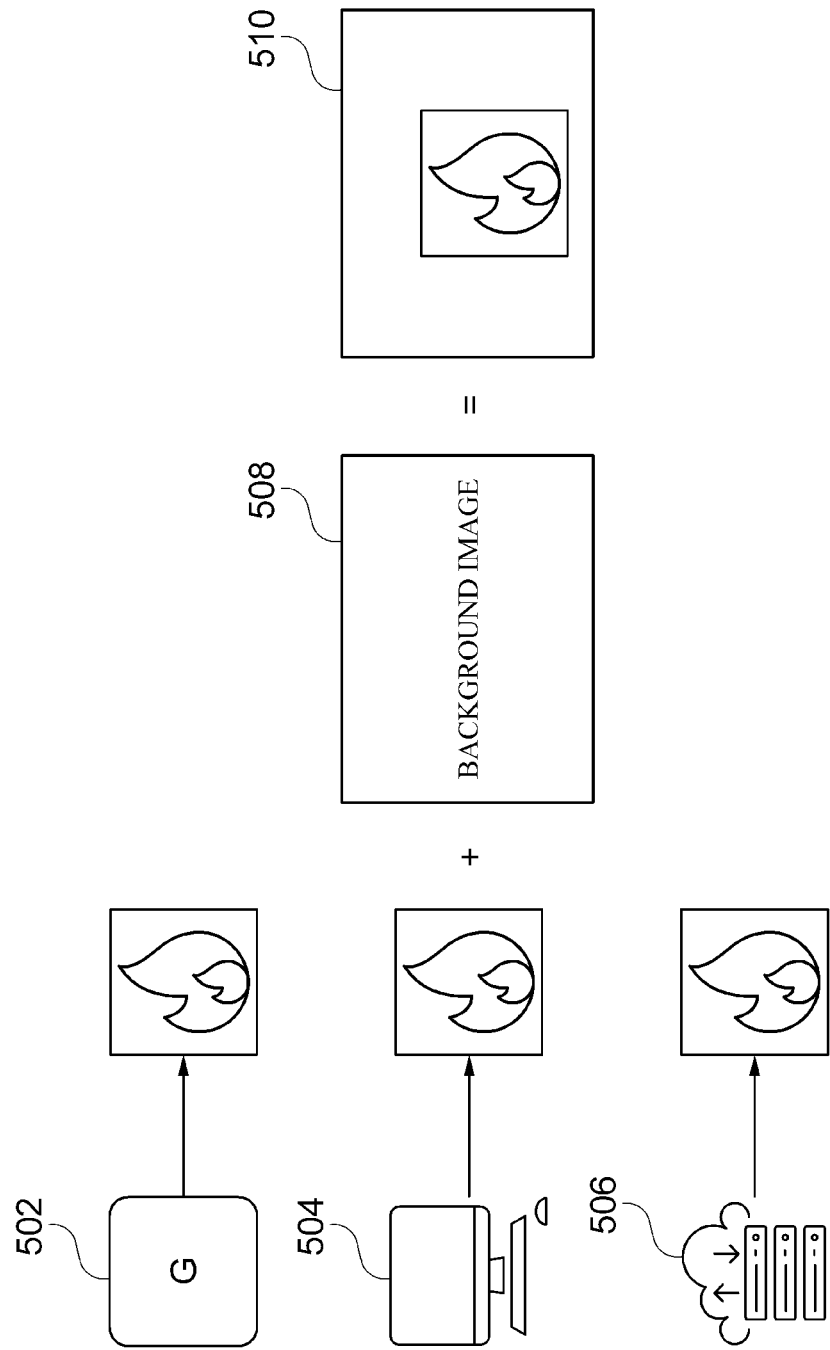

In addition, referring to FIG. 5, in the learning method according to the present exemplary embodiment, it is also possible to use a flame image 504 generated by 2D and 3D modeling through computer graphics in addition to a flame image 502 using the neural network model.

In addition, it is also possible to collect various flame images existing on a web and use a collected flame image 506 to generate a fake image, in addition to the generating of the flame images through the neural network model and computer modeling.

Specifically, as the flame image to be collected, an image of a format including a transparency of the background, preferably, a portable network graphic(s) (PNG) format may be used.

Referring to FIG. 5, in the learning method according to the present exemplary embodiment, a fake image 510 may be generated by combining the flame images generated by the plurality of methods described above with a background image 508.

The generated fake image 510 may be mapped to the same feature space as the real fire image by using the domain discriminator of the second neural network model according to FIG. 3 as described above, and the generated fake image may be used for learning.

Additionally, in the learning method according to the present exemplary embodiment, rotation, inversion, cropping, and the like of the generated learning image may be performed to increase the learning data. Further, it is also possible to increase the learning data by changing the learning image under an external environment affecting the occurrence of flame.

In this case, an increase rule of the data may be performed randomly and may be performed so that the increased data has a meaningful situation. For example, it is also possible to limit the increase of data to a fire situation that is difficult to really exist by rotation or inversion.

In relation to the external environment, since a flame detection rate in a dark environment and a flame detection rate in a bright environment may vary, a brightness of the generated learning image may be diversified and used as the learning data.

In addition, it is possible to increase the learning data by considering various external environment conditions such as external lighting, internal facilities, and background color.

In addition, it is also possible to increase the learning image by considering various capturing time points of a camera which captures an image for monitoring.

In the learning method according to the present invention hereinabove, the neural network model may learn to cope with a fire in various situations by securing data of various fire situations and increasing the data in consideration of the external environmental conditions.

In addition, by improving the quality of the data for learning, it is possible to improve the learning accuracy of the neural network model that determines the occurrence of a fire and ultimately to improve the flame detection performance of the neural network model.

<Flame Detection Method of Neural Network Model>

Hereinafter, a flame detection method for determining whether a flame is present from various source images using the learning models learned according to the above-described exemplary embodiments will be described.

In the flame detection method according to the present exemplary embodiment, an input source image may be input to a flame detection neural network model, and a fire situation may be determined by whether the flame is present in the image.

In this case, the neural network model used in the flame detection method needs to detect the flame from images input in various formats. A neural network model learned with learning data of a specific resolution and size may have different detection performance depending on a size or resolution of the source image input for detection.

Therefore, the neural network model according to the present exemplary embodiment may change the input data to show robust performance from diversity of the size or resolution of the source image.

That is, the neural network model may generate a plurality of source images by using a firstly input source image, determine whether a flame is present for each of the plurality of generated source images, and output a determination result.

Figure 6:
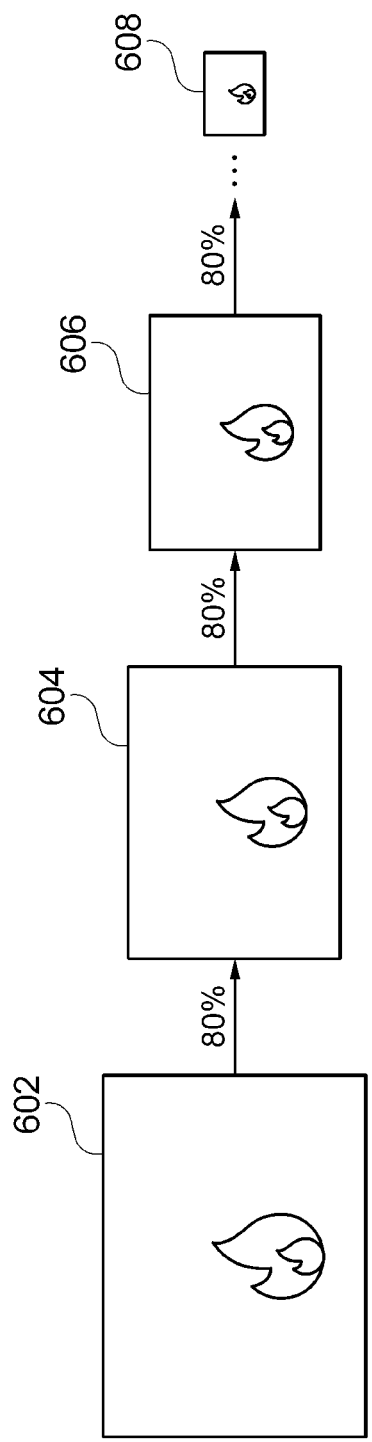
FIGS. 6 and 7 are views illustrating an example of generating input data for flame detection of a neural network model according to an exemplary embodiment of the present invention.

Specifically, referring to FIG. 6, in the flame detection method according to the present exemplary embodiment, a size of an image may be sequentially reduced according to a predetermined ratio so that a first source image 602 which is firstly input reaches an image of a target size.

For example, if the size of the first source image input is 1920×1080, the size of the first source image may be sequentially reduced by 80% to reduce up to a size of an N-th source image 608 having a size of 64×64.

In the flame detection method according to the present exemplary embodiment, if the flame is detected even in one of a plurality of source images by using all of the intermediate source images 604 and 606 generated in each reduction step as input data, it may be determined that a fire has occurred.

Figure 7:
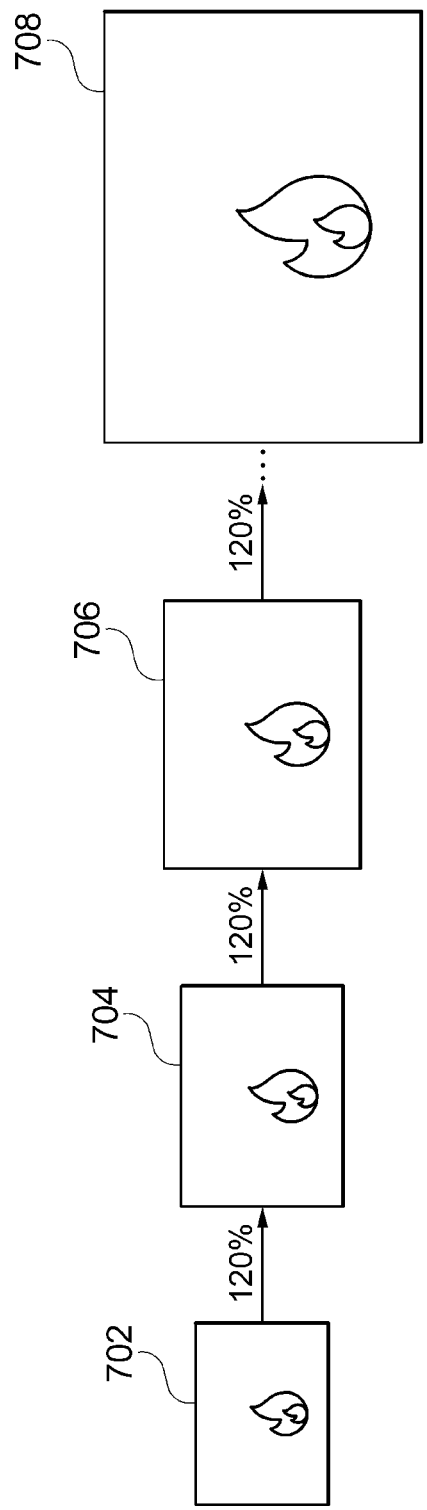

Alternatively, on the contrary, if a source image of a small size is input as illustrated in FIG. 7, it is also possible to sequentially enlarge a first source image 702 to reach an image 708 of a target size.

In the flame detection method, if the flame is detected even in one of a plurality of source images by using all of the intermediate source images 704 and 706 generated in a process of sequentially enlarging the first source image as an input, it may be determined that a fire has occurred.

In addition, when a size of an input/output value is determined according to a network structure of the neural network model, it is also possible to adjust the size of the source image generated by the enlargement or reduction through additional processing.

Specifically, it is also possible to fill the rest of the reduced image with blank values to prevent loss due to a difference in data size.

In the flame detection method according to the present exemplary embodiment hereinabove, although the neural network model has learned to detect the flame for the image of limited resolution and size, the neural network model may adaptively cope with various images by using a plurality of images generated by gradual reduction or enlargement of the source image for detection.

Therefore, the flame detection method may adaptively show robust performance even in a difference between input images according to capturing methods of various closed circuit televisions (CCTVs) or drones used in real fire monitoring.

Hereinafter, an internal layer structure of the neural network model of the flame detection method according to the present exemplary embodiment will be described with reference to FIG. 8.

The neural network model according to the present exemplary embodiment may design a structure of a convolution layer in consideration of the size of the input data and the size of the output data.

As described above, since the flame detection method diversifies the size of the source image and detects whether the flame is present in all source images, the convolution operation of the neural network model may be additionally performed as many as the number of generated source images.

Therefore, the neural network model according to the present exemplary embodiment may divide a convolution layer to cope with the plurality of source images.

Specifically, some channels of a single layer determined by the size of the input/output channel and the filter may be configured as a single channel, and the number of layers may be divided.

Figure 8:
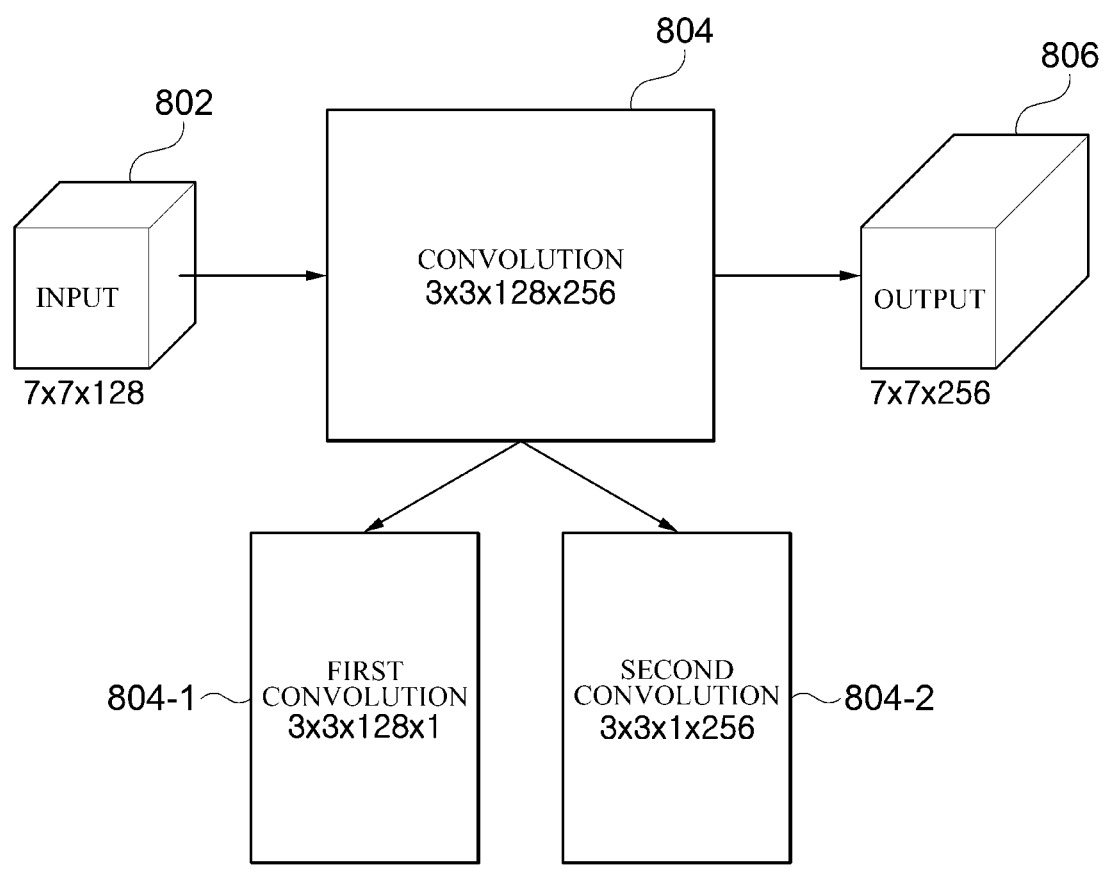
FIG. 8 is a view illustrating a layer configuration of the neural network model according to an exemplary embodiment of the present invention.

Referring to FIG. 8, in the present exemplary embodiment, the neural network model may be configured by two convolution layers.

For example, if it is assumed that a size of input data 802 is 7×7×128, a size of output data 806 is 7×7×256, and a filter of a 3×3 size is used as a single layer in the convolution operation for extracting feature values, the total number of convolution operations of a convolution layer 804 may be 3×3×128×265.

In this case, since the neural network model according to the present exemplary embodiment generates and uses one source image as a plurality of n source images, the total number of convolution operations is further increased by n.

Therefore, the neural network model according to the present exemplary embodiment may divide and configure the convolution layer in order for the neural network model to make a faster and more accurate determination of whether the flame is present.

Specifically, a single convolution layer 804 may be divided into a first convolution layer 804-1 and a second convolution layer 804-2, and the first convolution layer 804-1 and the second convolution layer 804-2 may be configured to be continuous. In this case, the first convolution layer 804-1 may be configured to have the number of channels of a single row and the second convolution layer 804-2 may be configured to have the number of channels of a single column.

That is, since the total number of operations becomes 3×3×(128+256) through the division of the layer, the number of operations may be reduced as compared to the number of operations according to the previous single layer.

Thereby, in the flame detection method according to the present exemplary embodiment, the increase in the amount of operation according to the plurality of source images is compensated by the reduction of the amount of convolution operation through the division of the layer, and as a result, the accuracy and time of detection of the neural network model may be optimized.

Figure 9:
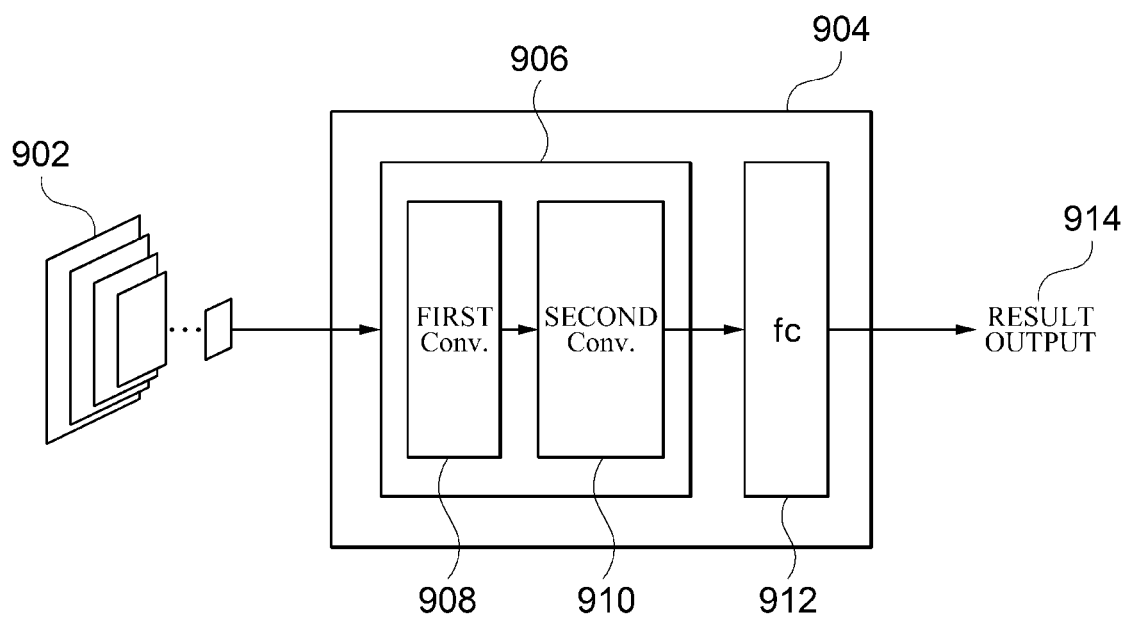
FIG. 9 is a view illustrating a structure of a neural network model according to an exemplary embodiment of the present invention.

Hereinafter, an overall configuration of the neural network model according to the present exemplary embodiment will be described with reference to FIG. 9.

As described above, the neural network model for flame detection may receive the gradually reduced or enlarged image (902), and determine whether the flame is present through the output result (914).

The neural network model 604 considers a size of input data and a size of output data, but may configure a convolution network 906 as a duplex 908 and 910. A feature map generated through the duplex convolution operation may be transferred as an input of a fully connected layer 912 and whether the flame is present may be finally output.

Specifically, information on whether the flame is present and a position of the flame in the image when the flame is present may be generated by the output of the fully connected layer.

The neural network model according to the flame detection method described above may reduce a determination error according to the size and resolution of the data input, and adaptively show high performance to various data.

Further, the layer of the neural network model may be reconstructed to efficiently generate a fast determination result even if the amount of input data is enormous.

Hereinabove, the various exemplary embodiments described herein may be implemented in a computer or similar device readable recording medium using, for example, software, hardware, or a combination thereof.

According to a hardware implementation, the exemplary embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the exemplary embodiments described in the present specification may be implemented by a control module itself.

According to a software implementation, the exemplary embodiments such as procedures and functions described in the present specification may be implemented as separate software modules. Each of the software modules may perform one or more functions and operations described in the present specification. Software code may be implemented in software applications written in a suitable programming language. The software code may be stored in a memory module and may be executed by the control module.

The above description is merely illustrative of the technical idea of the present invention, and various modifications, changes, and substitutions may be made by those skilled in the art without departing from the essential characteristics of the present invention.

Accordingly, the exemplary embodiments disclosed in the present invention and the accompanying drawings are not intended to limit the technical idea of the present invention but to describe the present invention, and the scope of the technical idea of the present invention is not limited by the exemplary embodiments and the accompanying drawings. The protection scope of the present invention should be interpreted by the following claims, and all technical ideas within the equivalent scope should be interpreted as being included in the scope of the present invention.

What is claimed is:

1. A learning method of a neural network model for a second object determination, the learning method comprising:
   generating a learning image including a real first object image, and a fake image generated by combining an arbitrary second object image with a background image;
   inputting the learning image to a first neural network model and outputting a determination result for whether a second object is present; and
   updating a weight in a layer of the first neural network model using the determination result,
   wherein the arbitrary second object image is generated according to a second neural network model using a second object discriminator, and
   wherein the fake image is generated according to a third neural network model learned to reduce a difference in a discrimination value that discriminates authenticity between the arbitrary second object image mapped to a same feature space of the real first object image.

2. The learning method of claim 1, wherein the first neural network model includes a plurality of layers, and at least one layer of the layers has the number of channels of a single row or column.

3. The learning method of claim 2, wherein the first neural network model is constituted by a plurality of layers having the channels of the single row or column and the number of input or output channels of the first neural network model.

4. The learning method of claim 1, wherein the arbitrary second object image is collected on a web.

5. The learning method of claim 1, wherein the arbitrary second object image is generated by computer modeling.

6. A second object detection method of a neural network model, the second object detection method comprising:
   generating a plurality of images by sequentially reducing a source image according to a predetermined ratio or size;
   inputting the plurality of images to a neural network model learned to determine whether a second object is present; and
   outputting, by the neural network model, whether the second object is present in one image of the plurality of images,
   wherein the neural network model is learned by repeatedly performing operations of:
      generating a learning image including a real first object image, and a fake image generated by combining an arbitrary second object image with a background image;
      inputting the learning image to a first neural network model and outputting a determination result for whether the second object is present; and
      updating a weight in a layer of the first neural network model using the determination result, wherein the arbitrary second object image is generated according to a second neural network model using a second object discriminator, and wherein the fake image is generated according to a third neural network model learned to reduce a difference in a discrimination value that discriminates authenticity between the arbitrary second object image mapped to a same feature space of the real first object image.

7. The second object detection method of claim 6, wherein the neural network model includes a plurality of layers, and at least one layer of the layers has the number of channels of a single row or column.

8. The second object detection method of claim 7, wherein the neural network model is constituted by a plurality of layers having the channels of the single row or column and the number of input or output channels of the neural network model.

9. A system comprising one or more computers and one or more storage devices that store instructions that, when executed by the one or more computers, cause the one or more computers to perform the operations of each method of claim 1.

10. A non-transitory computer readable medium storing instructions that, when executed by one or more computers, cause the one or more computers to perform the operations of each method of claim 1.

11. A non-transitory computer readable medium storing instructions that, when executed by one or more computers, cause the one or more computers to implement the system of claim 9.

* * * * *